June 21, 1960 J. E. TAYLOR 2,941,372
AIRCRAFT COOLING AND VAPOR UTILIZATION SYSTEM
Filed June 14, 1955
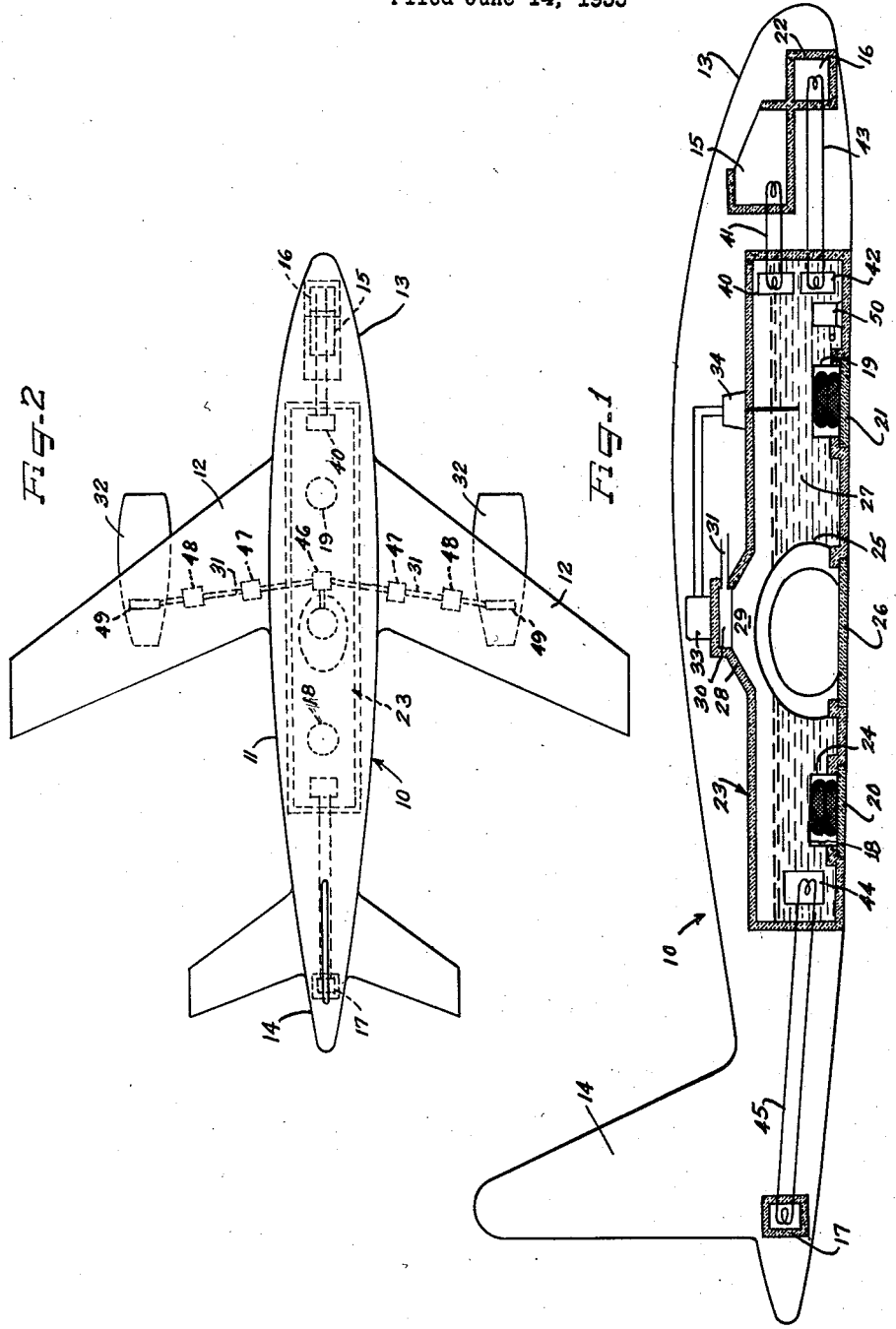
Inventor
JOHN E. TAYLOR United States Patent Office 2,941,372
Patented June 21, 1960

2,941,372

AIRCRAFT COOLING AND VAPOR UTILIZATION SYSTEM

John E. Taylor, Cleveland, Ohio, assignor to Thompson Ramo Wooldridge Inc., a corporation of Ohio Filed June 14, 1955, Ser. No. 515,402

5 Claims. (Cl. 62—7)

This invention relates to an aircraft cooling system, and more particularly to a system for utilizing the fuel itself for cooling component parts of a supersonic aircraft. The problem of operating supersonic aircraft is greatly complicated by the fact that due to friction in passing through the atmosphere even at densities such as obtain at levels above 30,000 feet, the "skin" of the airplane is heated to relatively high temperatures approximately 250 to 350° F., if the aircraft is flying at speeds approaching the region of Mach 2. Under supersonic conditions, a number of components of the aircraft have to be cooled, including warhead, tires, electronic components and space for the crew, as well as the engine oil. Calculations have shown that the cooling load on a representative aircraft may run of the order of one million B.t.u. per hour. The weight of an optimum ammonia boiler and expansion turbine to accommodate such cooling load for a strategic aircraft might be in the neighborhood of 1300 pounds. Such an added weight in the case of a strategic aircraft would be unattractive.

In accordance with the principles of my present invention, the latent heat of vaporization of the liquid fuel, itself, that is used for propelling the aircraft, is utilized for cooling purposes. At the present time, only the sensible heat of the liquid fuel is made use of, largely in oil-to-fuel heat exchangers. By utilizing the heat of vaporization of the fuel, the heat sink available would be increased by a factor of five under severe conditions.

In addition to using the latent heat of vaporization of the fuel for cooling purposes, my invention utilizes the vapors withdrawn from the fuel reservoir by burning the same either in conjunction with the liquid fuel or entirely as vapor fuel alone, in the engine or other combustion chambers, and particularly in an after burner. Thus, my invention provides a combined cooling and burning system that has particular application and utility in the operation of supersonic jet planes.

It should be expressly noted that in some aircraft and missile applications there may be little or no means for cooling certain components through boiling the fuel. In this event this invention still holds interest. A general situation is outlined below. First, let it be assumed that due to the possible need for internal pressurization of the fuselage and/or the fuel tanks for structural reasons, that the boiling of fuel would occur at a high temperature. For example if said tanks were pressurized to 30 p.s.i.a. and JP-5 fuel were being used, boiling would occur over a fuel temperature range of 300° F. to 500° F., approximately. This temperature range is too high to provide satisfactory cooling for the warhead, tires, electronics, etc. which in general must be prevented from exposure to temperatures above 185° F. to 200° F. Even though this condition is imposed, said invention is of value for this type aircraft because vapors which are formed and would otherwise be lost overboard may be burned to produce useful thrust from the engines. Secondly, under the conditions extant in the above example, even though the fuel at a temperature of 500° F., is too hot to cool many aircraft components as noted, the fuel would provide cooling for structural parts which at Mach No. 3 would be at perhaps 750° F. or above. Obviously the higher the Mach number the more important this latter effect becomes because of the loss of strength of structural materials at elevated temperatures.

Finally, even though structural cooling is not needed, it is important that fuel which would normally be lost through the vapor vents because of adiabatic losses during climb and because of aerodynamic heating be utilized in the engines. Calculations of loss of missile range have indicated that the magnitude of loss due to loss of vapor may be as high as 25% in range. For clarity, the case where cooling is not a primary goal has been termed vapor utilization.

It is therefore an important object of this invention to provide a cooling system for aircraft and missiles in which the latent heat of vaporization of the fuel itself is utilized for cooling components of the aircraft.

It is a further important object of this invention to provide a cooling and burning system in which vapors are withdrawn from the fuel reservoir at such a rate as to cause rapid evaporation and consequent cooling of the liquid fuel in the reservoir, utilizing such cooling effect either directly or indirectly for the cooling of components of the aircraft and utilizing the vapors withdrawn in one or more of the aircraft burners.

It is a further important object of this invention to solve the vapor loss problem and also the cooling problem simultaneously by the provision of a fuel vapor system in accordance with which rapid vaporization, or boiling, of the fuel is induced and the cooling effect thereby produced is utilized, and the vapors formed are drawn off and utilized in the engine combustion chambers as fuel.

It is a further important object of this invention to provide a means of utilizing fuel vapors formed in the tanks of airplanes and missiles due to adiabatic boiling and due to aerodynamic heating by leading these vapors by suitable means to combustion chambers where they can be burned usefully. This aspect of the invention is of much importance whether or not useful cooling is obtained since aircraft or missile range will be materially reduced if these vapors are not burned.

Other and further important objects of this invention will become apparent from the following description and appended claims.

On the drawings:

Figure 1 is a longitudinal sectional view, with parts shown schematically and partly in section, of an aircraft having installed therein a system embodying the principles of my invention.

Figure 2 is a top plan view, also schematic, of the aircraft.

As shown on the drawings:

The aircraft, indicated generally by the reference numeral 10, is shown in outline only as comprising a nacelle 11, wings 12, a nose section 13 and a tail section 14. Components of the aircraft that require cooling include a cockpit 15 and an enclosure 16 for the navigation aids, bomb damage assessment and fire control, mounted in the nose 13 of the aircraft; a compartment 17 for tail surveillance radar, and fire control radar, mounted in the tail section 14; and one or more compartments (2 being shown) 18 and 19, mounted in the nacelle in the belly section and accessible through doors 20 and 21, for containing tires or the retractable wheels themselves.

In the case of the compartments 15, 16 and 17, the interiors thereof may be more or less completely insulated by means of insulation indicated at 22. Insulation is not essential; however, for the example where insulation is used, the compartments 18 and 19 are positioned within an insulated fuel tank, indicated generally by the reference numeral 23, and the walls of said compartments 18 and 19 are formed of heat conductive material shown by lines of single thickness, as at 24.

The fuel tank 23 may also house a bomb-bay, indicated at 25, accessible through an insulated door 26. As illustrated, the fuel tank 23 is substantially filled with liquid fuel 27, which is in direct contact with the casings or housings 24 and 25. The upper wall of the insulated fuel tank 23 is centrally domed, as at 28 to provide a vapor space 29, in which is mounted a vapor pump 30 for withdrawing vapors from said space and discharging the vapors through one or more vapor lines 31 to one or more burners 32. The variation of system parameters which may exist over the wide range of supersonic aircraft and missiles to which this invention is applicable is great. For example the following parameters are variable:

(1) Amount of liquid extrained in the vapor being evolved.

(2) Rate of vapor formation.

(3) Engine fuel flow requirements and fraction of this total which can be in vapor form.

(4) Velocities and pressures throughout the system.

(5) Temperature of system components in or near the combustors.

Depending on the demands of individual aircraft designs, each of the parameters above will have significance in determining the need for vapor system components. For example, if the entrainment of liquid is excessive it may be required to install a liquid separator 46 (Fig. 2). If the rate of vapor formation is erratic it may be necessary to install surge damping devices 47 to reduce peak rates since high rates of change may not be compatible with smooth burning in the combustor.

With respect to the fraction of total fuel flow which may be in vapor form, this is greatly dependent on the combustor design. Some combustors are designed for the fuel to be delivered entirely in vapor form while others are designed for the fuel to be delivered primarily as liquid. The control 34 may be required to sense the fraction of vapor being introduced into the system in order to prevent inefficient combustion or blowout.

Fourth, since flame can travel upstream in a flowing gas if the gas velocity is lower than the fundamental flame propagation speed, a flame arrestor 48 may be required to prevent fire and explosion in the fuel tanks. Finally, in order to give good distribution of gas temperatures in the combustor, it will be necessary to provide vapor nozzles 49.

The vapors are particularly suitable for use in after burners, but may also be used in main burners. A suitable drive means, such as a motor 33 may be used to drive the vapor pump 30. The drive motor may be an air turbine or an electric or hydraulic motor, for example. Typical vapor pumps which could be used are:

(1) Conventional centrifugal compressors staged along a common shaft.

(2) Multi-stage radial flow compressors with additional stages carried by a common disc.

(3) Multi-stage axial-flow transonic or supersonic compressors.

(4). Hytor type compressors.

The drive means 33 is preferably controlled by means of control means 34 that are responsive to the temperature, and pressure of the liquid fuel within the fuel tank 23. Suitable electrical and thermo-responsive connections are provided between the control means 34, the drive means 33 and the interior of the fuel tank 23.

In addition to the direct heat exchange that takes place between the mass of liquid fuel 27 and the compartments or containers in direct contact with said fuel, secondary fluid heat exchangers are provided for cooling the enclosures 15, 16 and 17. As illustrated, a secondary fluid low pressure evaporator 40, positioned within the fuel tank 23, is arranged in heat flow interexchange relationship by means of coils 41 with the interior of the cockpit enclosure 15. A secondary fluid heat exchanger 42, also positioned within the fuel tank 23, is arranged in heat flow interchange relationship with the interior of the compartment 16 through the medium of coils 43. Another secondary fluid heat exchanger 44, positioned toward the rear of the fuel tank 23 and within said tank is in heat flow interchange relationship with the compartment 17 through the medium of coils 45. The construction and arrangement of these secondary fluid heat exchangers are sufficiently well known to those skilled in that art to require no further explanation.

Fuels that may be used in a system such as just described include those now being used in strategic jet planes, and such fuels are, in general, of higher volatility than kerosene although as pointed out above for vapor utilization, heavier fuels such as JP–5 may be used. One pertinent fuel is that known as JP–4, the composition and characteristics of which are published in military specification, MIL–F–5624B. By way of example, JP–4 fuel at 2 p.s.i.a. begins boiling at about 90° F. and thirty percent is boiled off at a temperature of 160° F., providing a cooling capacity of 100 B.t.u. for each pound vaporized. Thus there exists a sufficient temperature differential as compared with the 250 to 350° F., skin temperature at Mach 2 to make possible the utilization of the fuel as the coolant, either directly or indirectly, in the system above described. As is obvious, the cooling effect obtainable by the use of the latent heat of vaporization of the fuel need be utilized only under certain conditions, as when the aircraft is flying at such high speeds and/or in sufficiently dense atmospheres to cause excessive skin temperatures due to friction.

At those times when a cooling effect is required, the control 34 can be set to respond to any temperature that is readily attainable with the fuel being used, such as a temperature between 150 and 175° F., and then the control automatically controls the operation of the vapor pump drive means 33 to drive the vapor pump at such speed as to bring the fuel to that temperature. This is accomplished by such a rapid evacuation of vapors from the vapor space 29 as to cause rapid boiling of the liquid fuel in the mass of fuel 27, with a resultant cooling of such mass by the absorption therefrom of the necessary amount of heat to supply that required to convert the liquid fuel into vapor. The vapor so withdrawn is discharged by the vapor pump 30 through lines 31 into burners 32. This burning of the vapors is in addition to the burning of liquid fuel, withdrawn in the usual way through one or more booster pumps 50 for being fed into the engines.

By the operation of a cooling system such as described, it is possible to accommodate all of the cooling load, except cabin cooling, of a number of supersonic aircraft, with a direct weight saving of up to 1000 pounds for a strategic aircraft. Indirect weight saving through the reduction of fuel tank pressurization requirements have not been estimated, but may be considerable. In addition, fuel losses caused by vapor flowing out the vents, which may amount to 5% to 15% of the total fuel aboard the aircraft, can be eliminated. A small additional gain of perhaps 1% is obtained by avoiding the need for vaporising the fuel inside the burner where cooling is not desired.

The term "aircraft" as used in the specification and claims is intended to include missiles and other fuel-powered devices designed to be projected at supersonic speeds.

I claim as my invention:

1. In a supersonic aircraft, a cooling system comprising an insulated liquid fuel tank, containers within said tank for housing components of the aircraft that are affected deleteriously by excessively high temperatures, said containers being normally in heat exchange relationship with the liquid fuel in said tank, closure members for said containers removable to give access thereto for the removal of said components, a vapor pump for withdrawing vapors from said tank and means for controlling the rate of withdrawal of such vapors so as to obtain a lowering of the temperature of said liquid fuel to effect a cooling of said containers and the components therein.

2. In a supersonic aircraft, a cooling system comprising a heat insulated liquid fuel tank, means in heat exchange engagement with the liquid fuel in said tank, pump means registering with the interior of said tank for effecting a sufficiently rapid withdrawal of fuel vapors from said tank to substantially lower the temperature of the liquid fuel therein, pump control means responsive to the liquid fuel temperature, and a compartment separate from said tank in heat flow relationship with said heat exchange means to be cooled thereby.

3. In a supersonic aircraft, a cooling system comprising a heat insulated liquid fuel tank, means in heat exchange engagement with the liquid fuel in said tank, pump means registering with the interior of said tank for effecting a sufficiently rapid withdrawal of fuel vapors from said tank to substantially lower the temperature of the liquid fuel therein and means controlling the operation of said pump means in accordance with the temperature of the liquid fuel in said tank.

4. In a supersonic aircraft, a cooling system comprising a heat insulated liquid fuel tank, means in heat exchange engagement with the liquid fuel in said tank, pump means registering with the interior of said tank for effecting a sufficiently rapid withdrawal of fuel vapors from said tank to substantially lower the temperature of the liquid fuel therein, a burner connected to said pump to burn the vapors removed from said tank by said pump, at least one compartment separate from said tank in heat flow relationship with said heat exchange means to be cooled thereby, means controlling the operation of said pump means in accordance with the temperature of the liquid fuel in said tank and at least one compartment in said tank for direct contact with said liquid to cool said compartment in said tank and any aircraft components housed therein.

5. In a supersonic aircraft having an engine including burners and combustors, a vapor utilization system comprising a means of conducting fuel vapors generated as a result of pressure change or aerodynamic heating in aircraft fuel tanks to said engine, means of separating liquid fuel from vapor, means of controlling total liquid and vapor fuel flow to said burners by reducing the flow of liquid fuel to compensate for increases in the flow of vapor fuel, means of smoothing surges in vapor fuel delivery, means of preventing combustor flame from flashing back in vapor lines, and means of distributing vapor in said engine combustors.

References Cited in the file of this patent

UNITED STATES PATENTS

| | | |
|---|---|---|
| 2,001,484 | Buckman | May 14, 1935 |
| 2,082,850 | Schlumbohm | June 8, 1937 |
| 2,142,828 | Smith | Jan. 3, 1939 |
| 2,145,678 | Backstrom | Jan. 31, 1939 |
| 2,183,452 | Gibbs et al. | Dec. 12, 1939 |
| 2,365,786 | Tull | Dec. 26, 1944 |

FOREIGN PATENTS

| | | |
|---|---|---|
| 612,468 | Great Britain | Nov. 12, 1948 |